United States Patent
Zhang et al.

(10) Patent No.: US 9,624,321 B2
(45) Date of Patent: Apr. 18, 2017

(54) FORMATION OF A ZIEGLER-NATTA CATALYST

(71) Applicant: FINA TECHNOLOGY, INC., Houston, TX (US)

(72) Inventors: Lei Zhang, League City, TX (US); David J. Rauscher, Longview, TX (US)

(73) Assignee: Fina Technology, Inc., Houston, TX (US)

( * ) Notice: Subject to any disclaimer, the term of this patent is extended or adjusted under 35 U.S.C. 154(b) by 370 days.

(21) Appl. No.: 14/304,358

(22) Filed: Jun. 13, 2014

(65) Prior Publication Data

US 2015/0361188 A1   Dec. 17, 2015

(51) Int. Cl.
*C08F 10/02* (2006.01)
*C08F 110/02* (2006.01)

(52) U.S. Cl.
CPC .................................. *C08F 110/02* (2013.01)

(58) Field of Classification Search
None
See application file for complete search history.

(56) References Cited

U.S. PATENT DOCUMENTS

| | | |
|---|---|---|
| 4,271,060 A | 6/1981 | Hubby |
| 4,543,399 A | 9/1985 | Jenkins, III et al. |
| 4,588,790 A | 5/1986 | Jenkins, III et al. |
| 5,001,205 A | 3/1991 | Hoel |
| 5,028,670 A | 7/1991 | Chinh et al. |
| 5,236,998 A | 8/1993 | Lundeen et al. |
| 5,317,036 A | 5/1994 | Brady, III et al. |
| 5,352,749 A | 10/1994 | DeChellis et al. |
| 5,405,922 A | 4/1995 | DeChellis et al. |
| 5,436,304 A | 7/1995 | Griffin et al. |
| 5,456,471 A | 10/1995 | MacDonald |
| 5,462,999 A | 10/1995 | Griffin et al. |
| 5,525,678 A | 6/1996 | Mink et al. |
| 5,589,555 A | 12/1996 | Zboril et al. |
| 5,616,661 A | 4/1997 | Eisinger et al. |
| 5,627,242 A | 5/1997 | Jacobsen et al. |
| 5,665,818 A | 9/1997 | Tilston et al. |
| 5,668,228 A | 9/1997 | Chinh et al. |

(Continued)

FOREIGN PATENT DOCUMENTS

CA   2016930 A1   11/1990

OTHER PUBLICATIONS

International Search Report and Written Opinion issued in PCT/US2015/034861, dated Aug. 26, 2015, 9 pages.

(Continued)

*Primary Examiner* — Catherine S Branch
(74) *Attorney, Agent, or Firm* — Albert Shung

(57) ABSTRACT

A process of forming a Ziegler-Natta catalyst component is disclosed. The process includes contacting an alkyl magnesium compound with an alcohol and a first organoaluminum compound to form a magnesium dialkoxide compound and contacting the magnesium dialkoxide compound with a titanating agent to form reaction product "A." The process further includes reacting reaction product "A" with a halogenating agent to form reaction product "B" and reacting reaction product "B" with a second organoaluminum compound to form a single halogenated catalyst component.

19 Claims, 1 Drawing Sheet

(56) References Cited

U.S. PATENT DOCUMENTS

| | | | |
|---|---|---|---|
| 5,677,375 | A | 10/1997 | Rifi et al. |
| 5,945,366 | A | 8/1999 | Kataoka et al. |
| 6,147,173 | A | 11/2000 | Holtcamp |
| 6,180,735 | B1 | 1/2001 | Wenzel |
| 6,207,606 | B1 | 3/2001 | Lue et al. |
| 6,211,105 | B1 | 4/2001 | Holtcamp |
| 6,242,545 | B1 | 6/2001 | Jejelowo et al. |
| 6,245,705 | B1 | 6/2001 | Kissin |
| 6,245,868 | B1 | 6/2001 | Agapiou et al. |
| 6,248,845 | B1 | 6/2001 | Loveday et al. |
| 6,271,323 | B1 | 8/2001 | Loveday et al. |
| 6,274,684 | B1 | 8/2001 | Loveday et al. |
| 6,300,436 | B1 | 10/2001 | Agapiou et al. |
| 6,339,134 | B1 | 1/2002 | Crowther et al. |
| 6,340,730 | B1 | 1/2002 | Murray et al. |
| 6,346,586 | B1 | 2/2002 | Agapiou et al. |
| 6,359,072 | B1 | 3/2002 | Whaley |
| 6,380,328 | B1 | 4/2002 | McConville et al. |
| 6,399,837 | B1 | 6/2002 | Wilson et al. |
| 6,420,580 | B1 | 7/2002 | Holtcamp et al. |
| 2007/0225390 | A1 | 9/2007 | Wang et al. |
| 2007/0299224 | A1 | 12/2007 | Vizzini et al. |
| 2008/0275197 | A1 | 11/2008 | Coffy et al. |
| 2012/0202955 | A1* | 8/2012 | Zhang .................... C08F 10/00 526/119 |
| 2012/0282422 | A1 | 11/2012 | Boissiere et al. |

OTHER PUBLICATIONS

Kirk-Othmer, Encyclopedia of Chemical Technology, vol. 17, 4th Edition, pp. 735-737 (1996).

\* cited by examiner

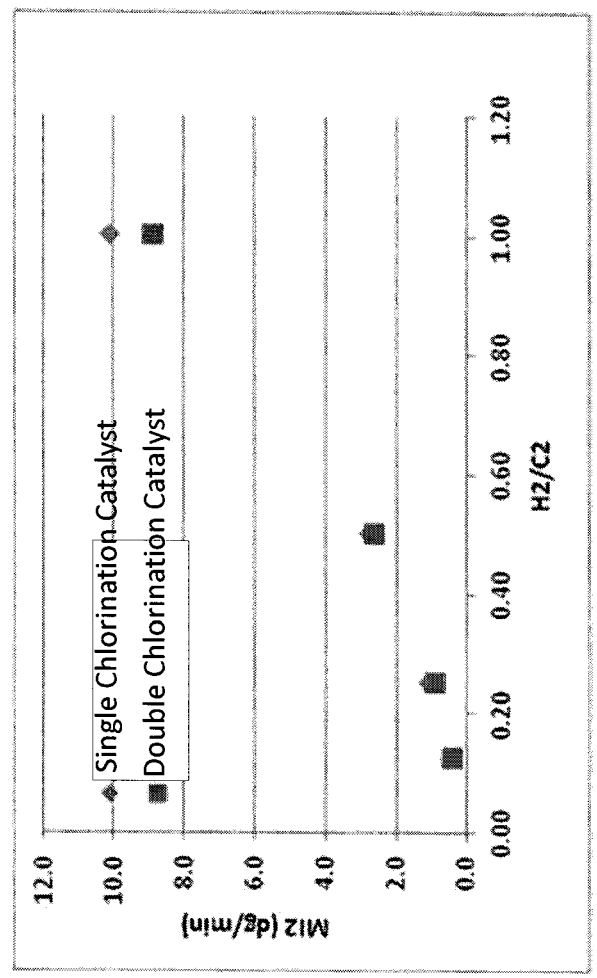

FORMATION OF A ZIEGLER-NATTA CATALYST

RELATED APPLICATIONS

None

FIELD

This disclosure generally relates to methods of forming Ziegler-Natta catalyst compositions.

BACKGROUND

Ziegler-Natta catalyst systems may be formed from the combination of a metal component (e.g., a catalyst precursor) with one or more additional components, such as a catalyst support, a cocatalyst and/or one or more electron donors, for example.

An example of a Ziegler-Natta catalyst includes a metal component represented by the formula:

$$MR^A_x;$$

wherein M is a transition metal, $R^A$ is a halogen, an alkoxy or a hydrocarboxyl group and x is the valence of the transition metal. For example, x may be from 1 to 4. Such a catalyst system may be used to form polyolefin compositions.

SUMMARY

A process of forming a Ziegler-Natta catalyst component is disclosed. The process includes contacting an alkyl magnesium compound with an alcohol and a first organoaluminum compound to form a magnesium dialkoxide compound and contacting the magnesium dialkoxide compound with a titanating agent to form reaction product "A." The process further includes reacting reaction product "A" with a halogenating agent to form reaction product "B" and reacting reaction product "B" with a second organoaluminum compound to form a single halogenated catalyst component.

In another embodiment, a process of forming a polyolefin is disclosed. The process includes supplying a Ziegler-Natta catalyst, wherein the Ziegler Natta catalyst comprises a Ziegler Natta catalyst component. The Ziegler catalyst component is made by contacting an alkyl magnesium compound with an alcohol and a first organoaluminum compound to form a magnesium dialkoxide compound and contacting the magnesium dialkoxide compound with a titanating agent to form reaction product "A." The process of making the Ziegler Natta component further includes reacting reaction product "A" with a halogenating agent to form reaction product "B" and reacting reaction product "B" with a second organoaluminum compound to form a single halogenated catalyst component. The process of forming the polyolefin further includes contacting the Ziegler Natta catalyst with an olefin monomer in a reactor under reactor conditions to form the polyolefin.

BRIEF DESCRIPTION OF THE DRAWING

The present disclosure is best understood from the following detailed description when read with the accompanying FIGURE.

FIGURE is a plot of H2/C2 versus MI2 (dg/min) consistent with the Examples.

DETAILED DESCRIPTION

Definitions

A detailed description will now be provided. The following disclosure includes specific embodiments, versions and examples, but the disclosure is not limited to these embodiments, versions or examples, which are included to enable a person having ordinary skill in the art to make and use embodiments when the information in this disclosure is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

The term "activity" refers to the weight of product produced per weight of the catalyst used in a process per hour of reaction at a standard set of conditions (e.g., grams product/gram catalyst/hr).

The term "substituted" refers to an atom, radical or group that replaces a hydrogen in a chemical compound.

The term "blend" refers to a mixture of compounds that are blended and/or mixed prior to contact with another compound.

As used herein, "density" is measured via ASTM-D-792.

As used herein, "melt flow index" is measured via ASTM-D-1238-01 (Method A—Cut and Weigh).

The term "equivalent" refers to a molar ratio of two components.

As used herein, "molecular weight distribution" is the ratio of the weight average molecular weight to the number average molecular weight (Mw/Mn) of a polymer.

As used herein, "room temperature" includes a temperature of from about 20° C. to about 28° C. (68° F. to 82° F.) However, room temperature measurements generally do not include close monitoring of the temperature of the process and therefore such a recitation does not intend to bind the embodiments described herein to any predetermined temperature range. Furthermore, a temperature difference of a few degrees does not matter to the phenomenon under investigation, such as a preparation method.

As used herein, "copolymer" refers to any polymeric material comprising two or more different monomers.

A specific example of a Ziegler-Natta catalyst includes a metal component represented by the formula:

$$MR^A_x;$$

wherein M is a transition metal, $R^A$ is a halogen, an alkoxy or a hydrocarboxyl group and x is the valence of the transition metal. For example, x may be from 1 to 4.

The transition metal may be selected from Groups IV through VIB (e.g., titanium, vanadium or chromium), for example. $R^A$ may be selected from chlorine, bromine, carbonates, esters, or alkoxy groups in one or more embodiments. Examples of metal components include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$.

Those skilled in the art will recognize that a catalyst may be "activated" in some way before it is useful for promoting polymerization. As discussed further below, activation may be accomplished by contacting the catalyst with a Ziegler-Natta activator (Z-N activator), which is also referred to in some instances as a "cocatalyst." Embodiments of such Z-N activators include organoaluminum compounds, such as trimethyl aluminum (TMA), triethyl aluminum (TEAl) and triisobutyl aluminum (TIBAl), for example.

The Ziegler-Natta catalyst system may further include one or more electron donors, such as internal electron donors and/or external electron donors. Internal electron donors may be used to reduce the atactic form of the resulting polymer, thus decreasing the amount of xylene solubles in the polymer. The internal electron donors may include amines, amides, esters, ketones, nitriles, ethers, phosphines, diethers, succinates, phthalates, or dialkoxybenzenes, for example. (See, U.S. Pat. No. 5,945,366 and U.S. Pat. No. 6,399,837, which are incorporated by reference herein.)

External electron donors may be used to further control the amount of atactic polymer produced. The external electron donors may include monofunctional or polyfunctional carboxylic acids, carboxylic anhydrides, carboxylic esters, ketones, ethers, alcohols, lactones, organophosphorus compounds and/or organosilicon compounds. In one embodiment, the external donor may include diphenyldimethoxysilane (DPMS), cyclohexymethyldimethoxysilane (CDMS), diisopropyldimethoxysilane and/or dicyclopentyldimethoxysilane (CPDS), for example. The external donor may be the same or different from the internal electron donor used.

The components of the Ziegler-Natta catalyst system (e.g., catalyst, activator and/or electron donors) may or may not be associated with a support, either in combination with each other or separate from one another. The support materials may include a magnesium dihalide, such as magnesium dichloride or magnesium dibromide, or silica, for example.

A representative, non-limiting, illustration of a reaction scheme 1 for forming a double halogenated catalyst may be illustrated as follows:

$$MgR^1R^2 + AlR^7{}_3 + 2R^3OH \rightarrow Mg(OR^3)_2 \quad \quad 1)$$

$$Mg(OR^3)_2 + Ti(OR^5)_4 \rightarrow \text{``A''} \quad \quad 2)$$

$$\text{``A''} + TiCl_4 \rightarrow \text{``B''} \quad \quad 3)$$

$$\text{``B''} + TiCl_4 \rightarrow \text{``C''} \quad \quad 4)$$

$$\text{``C''} + AlR^6{}_3 \rightarrow \text{Double Halogenated Catalyst} \quad \quad 5)$$

A representative, non-limiting, illustration of a reaction scheme 2 for forming a single halogenated catalyst may be illustrated as follows:

$$MgR^1R^2 + AlR^7{}_3 + 2R^3OH \rightarrow Mg(OR^3)_2 \quad \quad 1)$$

$$Mg(OR^3)_2 + Ti(OR^5)_4 \rightarrow \text{``A''} \quad \quad 2)$$

$$\text{``A''} + TiCl_4 \rightarrow \text{``B''} \quad \quad 3)$$

$$\text{``B''} + AlR^6{}_3 \rightarrow \text{Single Halogenated Catalyst} \quad \quad 4)$$

Note that while the primary reaction components are illustrated above, additional components may be reaction products or used in such reactions and not illustrated above. Further, while described herein in terms of primary reaction steps, it is known to those skilled in the art that additional steps may be included in the reaction schemes and processes described herein (e.g., washing, filtering, drying or decanting steps), while it is further contemplated that other steps may be eliminated in certain embodiments.

Such methods generally include contacting an alkyl magnesium compound with an alcohol and a first organoaluminum compound to form a magnesium dialkoxide compound. Such reaction may occur at a reaction temperature ranging from room temperature to about 90° C. for a time of up to about 10 hours, for example.

With respect to both reaction schemes 1 and 2, the alcohol may be added to the alkyl magnesium compound in an equivalent of from about 0.5 to about 6 or from about 1 to about 3, for example.

The alkyl magnesium compound may be represented by the following formula:

$$MgR^1R^2;$$

wherein $R^1$ and $R^2$ are independently selected from $C_1$ to $C_{10}$ alkyl groups. Non-limiting illustrations of alkyl magnesium compounds include butyl ethyl magnesium (BEM), diethyl magnesium, dipropyl magnesium and dibutyl magnesium, for example.

The alcohol may be represented by the formula:

$$R^3OH;$$

wherein $R^3$ is selected from $C_2$ to $C_{20}$ alkyl groups. Non-limiting illustrations of alcohols generally include butanol, isobutanol and 2-ethylhexanol, for example. The alcohol may be added to the alkyl magnesium compound in an equivalent of from about 1.0 to about 4 or from 2 to about 3, for example.

The first organoaluminum compound may include aluminum alkyls having the following formula:

$$AlR^7{}_3;$$

wherein $R^7$ is a $C_1$ to $C_{10}$ alkyl compound. Non-limiting illustrations of the aluminum alkyl compounds generally include trimethyl aluminum (TMA), triisobutyl aluminum (TIBAl), triethyl aluminum (TEAl), tri-n-octylaluminum (TNOAl), n-octyl aluminum and n-hexyl aluminum, for example. The organoaluminum compound may be added to the alkyl magnesium compound in an equivalent of from about 0.1 to about 2 or from 0.5 to about 1.2, for example.

The alcohol and the first organoaluminum compound may be added to the alkyl magnesium compound sequentially or together. The order of addition may be the alcohol followed by the first organoaluminum compound or the first organoaluminum compound followed by the alcohol.

The method according to reaction scheme 1 or 2 may then include contacting the magnesium dialkoxide compound with a titanating agent, to form reaction product "A". In certain embodiments of the present disclosure, the titanating agent is a single titanium compound, i.e., it is not a blend of compounds containing titanium.

The reaction of the magnesium dialkoxide compound with the titanating agent may occur in the presence of an inert solvent. The inert solvent can be a hydrocarbon. The hydrocarbon selected should remain in liquid form at reaction temperatures and the ingredients used to form the catalyst composition should be at least partially soluble in the hydrocarbon. Accordingly, the hydrocarbon is considered to be a solvent herein, even though in certain embodiments the ingredients are only partially soluble in the hydrocarbon.

Suitable hydrocarbon solvents include substituted and unsubstituted aliphatic hydrocarbons and substituted and unsubstituted aromatic hydrocarbons. For example, the inert solvent may include hexane, heptane, octane, decane, toluene, xylene, dichloromethane, chloroform, 1-chlorobutane or combinations thereof, for example.

The titanating agent may be added to reaction product "A" in an equivalent of from about 0.25 to about 2, or from about 0.5 to about 1 or about 0.75, for example.

The titanating agent may be represented by the following formula:

$$Ti(OR^5)_4;$$

wherein $R^5$ is selected from $C_2$ to $C_{20}$ alkyl groups. Non-limiting illustrations of titanating agents include titanium alkoxides, such as $Ti(OiPr)_4$, or $Ti(OBu)_4$.

The method in both reaction schemes 1 and 2 may then include reacting reaction product "A" with a first halogenating agent to form reaction product "B". Reaction product "B" may be a solid. In certain embodiments of the present disclosure, the first halogenating agent is a single halogenated compound, i.e., it is not a blend of compounds.

The reaction of reaction product "A" with the first halogenating agent may occur in the presence of an inert solvent. The inert solvent may include any of those solvents previously discussed herein, for example. The reaction may further occur at room temperature, for example.

The first halogenating agent may be added to the reaction product "A" in an equivalent of from about 0.1 to about 5, or from about 0.25 to about 4 or from about 0.45 to about 4.5, for example.

Non-limiting illustrations of the first halogenating agent include titanium halides. The titanium halides may include any titanium halide, such as titanium tetrachloride ($TiCl_4$), for example. The first halogenating agent may be added in an equivalent of from about 0.1 to about 5, or from about 0.25 to about 4 or from about 0.45 to about 4.5, for example.

In the reaction scheme 1 for forming the double halogenated catalyst, reaction product "B" may be reacted with a second halogenating agent to form reaction product "C." This reaction may occur in the presence of an inert solvent. The inert solvent may include any of those solvents previously discussed herein, for example. The reaction may occur at room temperature, for example. Reaction product "C" may be a solid. In certain embodiments of the present disclosure, the second halogenating agent is a single titanium compound, i.e., it is not a blend of compounds containing titanium.

The second halogenating agent may be added to the reaction product "B" in an equivalent of from about 0.1 to about 5, or from about 0.25 to about 4 or from about 0.45 to about 4.5, for example. The second halogenating agent may include any halogenating agent previously described herein.

In reaction scheme 1 for forming the double halogenated catalyst, the method may then include contacting reaction product "C" with a second organoaluminum compound to form the double halogenated catalyst component.

The second organoaluminum compound may be added to reaction product "C" in an equivalent of from about 0.1 to about 2 or from 0.5 to about 1.2, for example. Non-limiting illustrations of second organoaluminum compounds may include aluminum alkyls having the following formula:

$$AlR^6{}_3;$$

wherein $R^6$ is a $C_1$ to $C_{10}$ alkyl compound. Non-limiting illustrations of the aluminum alkyl compounds generally include trimethyl aluminum (TMA), triisobutyl aluminum (TIBAl), triethyl aluminum (TEAl), tri-n-octylaluminum (TNOAl), n-octyl aluminum and n-hexyl aluminum, for example. The second organoaluminum compound may be the same or different than the first organoaluminum compound.

A non-limiting example of a reaction scheme in accordance with reaction scheme 1 is reaction scheme 1(a):

BEM+0.25 equivalents TEAl+2.85 equivalents 2-ethylhexanol→Mg(2-EHO)$_2$  (1)

Mg(2-EHO)$_2$+0.75 equivalents Ti(OiPr)$_4$→solution A  (2)

Solution A+3.0 equivalents TiCl$_4$→solid B  (3)

Solid B+2.0 equivalents TiCl$_4$→solid C  (4)

Solid C+0.16 equivalents TEAl→Catalyst component 1(a)  (5)

In the reaction scheme 2 for forming the single halogenated catalyst, the method may include contacting reaction product "B" with the second organoaluminum compound to form the single halogenated catalyst component. A non-limiting example of a reaction scheme in accordance with reaction scheme 2 is reaction scheme 2(a):

BEM+0.25 equivalents TEAl+2.85 equivalents 2-ethylhexanol→Mg(2-EHO)$_2$  (1)

Mg(2-EHO)$_2$+0.75 equivalents Ti(OiPr)$_4$→solution A  (2)

Solution A+3.0 equivalents TiCl$_4$→solid B  (3)

Solid B+0.16 equivalents TEAl→Catalyst component 2(a)  (4)

In certain embodiments, reaction scheme 2 does not include a second chlorination step, such as with TiCl$_4$.

Catalyst compositions made in accordance with the present disclosure may be activated. In certain embodiments, this activation may be performed by adding an activator, such as an organoaluminum compound, to the catalyst component made in accordance with the reaction schemes shown above. In certain non-limiting examples, this activator is TiBAl.

Polyolefin Compositions

The catalyst systems described herein may be used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. Other monomers include ethylenically unsaturated monomers, $C_4$ to $C_{18}$ diolefins, conjugated or nonconjugated dienes, polyenes, vinyl monomers and cyclic olefins, for example. Non-limiting examples of other monomers may include norbornene, norbornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Catalyst systems made in accordance with reaction scheme 1 may have a catalyst activity when manufacturing polyethylene of from about 30,000 g PE/g cat to 70,000 g PE/g cat or from about 36,000 g PE/g cat to 61,000 g PE/g cat.

Catalyst systems made in accordance with reaction scheme 2 may have a catalyst activity when manufacturing polyethylene of from about 10,000 g PE/g cat to 35,000 g PE/g cat or from about 13,000 g PE/g cat to 32,000 g PE/g cat.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst and optionally a co-catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process. However, a process may be a bulk process, a slurry process or a bulk slurry process, for example.

In an embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 45 bar and a temperature of from about 38° C. to about 121° C., for example. Reaction heat may be removed through the loop wall via any method known to one skilled in the art, such as via a double-jacketed pipe.

In an embodiment, a slurry process using continuous stirred tank reactors, such as the Hoechst process (see Kirk-Othmer, Encyclopedia of Chemical Technology, Volume 17, $4^{th}$ Edition, pages 735-737 (1996), which is herein incorporated by reference), may be carried out. Hexane is used as the diluent. The reactors may be operated at 75° C. to 95° C. and a total pressure of 1 atm to 12.5 atm. Ethylene comonomer, solvent, catalyst components, and hydrogen are continuously fed into the reactor. Residence time of the catalyst is from 1 to 6 hours. Optionally, hydrogen may be added to the process, such as for molecular weight control of the resultant polymer. Optionally, other monomers, such as butene, may also be added to the process.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene and polypropylene copolymers, for example.

Unless otherwise designated herein, all testing methods are the current methods at the time of filing.

The polymers may have a narrow molecular weight distribution ($M_w/M_n$). As used herein, the term "narrow molecular weight distribution" refers to a polymer having a molecular weight distribution of from about 1.5 to about 8, or from about 2.0 to about 7.5 or from about 2.0 to about 7.0, or from about 4.5 to about 6, for example, as measured by GPC.

In one or more embodiments, the polymers include ethylene based polymers. As used herein, the term "ethylene based" is used interchangeably with the terms "ethylene polymer" or "polyethylene" and refers to a polymer having at least about 50 wt. %, or at least about 70 wt. %, or at least about 75 wt. %, or at least about 80 wt. %, or at least about 85 wt. % or at least about 90 wt. % polyethylene relative to the total weight of polymer, for example.

The ethylene based polymers may have a narrow molecular weight distribution ($M_w/M_n$).

The ethylene based polymers may have a density (as measured by ASTM D-792) of from about 0.86 g/cc to about 0.98 g/cc, or from about 0.88 g/cc to about 0.965 g/cc, or from about 0.90 g/cc to about 0.965 g/cc, or from about 0.925 g/cc to about 0.97 g/cc, or from about 0.95 to about 0.965, for example.

The ethylene based polymers may have a melt index ($MI_2$) (as measured by ASTM D-1238) of from about 0.01 dg/min to about 100 dg/min., or from about 0.01 dg/min. to about 25 dg/min., or from about 0.03 dg/min. to about 15 dg/min. or from about 0.05 dg/min. to about 10 dg/min, or from 0.30 dg/min to 11 dg/min, for example. The ethylene based polymers may have a high load melt index (HLMI) of from 1 dg/min. to 500 dg/min., or from 10 dg/min. to 300 dg/min, as measured by ASTM D-1238.

Fluff bulk density of polyethylene made in accordance with reaction scheme 1 may range from about 0.39 g/mL to about 0.41 g/mL. Fluff percent fines (<63 µm) of polyethylene made in accordance with reaction scheme 1 may range from about 0 to about 25. Fluff average particle size (D50) of polyethylene made in accordance with reaction scheme 1 may range from 90 µm to about 200 µm.

Fluff bulk density of polyethylene made in accordance with reaction scheme 2 may range from about 0.33 g/mL to about 0.40 g/mL. Fluff percent fines (<63 µm) of polyethylene made in accordance with reaction scheme 2 may range from about 0 to about 10. Fluff average particle size (D50) of polyethylene made in accordance with reaction scheme 1 may range from 100 µm to about 150 µm.

EXAMPLES

The following examples are provided merely to illustrate certain embodiments of the disclosure, and to demonstrate the practice and advantages thereof. It is understood that the examples are given by way of illustration and are not intended to limit the scope of the specification or the claims in any manner.

Certain test methods were used in determining the physical properties of the resin and the end-use products. Those test methods are listed below and are readily available to those of ordinary skill in the art.

Tests run on the resin included melt index using ASTM D1238 (A), and density using ASTM D792.

In the following examples, the Ziegler-Natta catalyst compounds were prepared in a 500 mL reactor equipped with four Morten's indentions and a dropping funnel, three-blade agitator and septa.

Example 1

Polyethylene was manufactured using a catalyst formed in accordance with reaction scheme 1(a). A TiBAl activator was used. Reaction characteristics are shown in Table 1.

TABLE 1

| Test # | g of catalyst injected | Mg in catalyst (wt. %) | Aluminum (mol/L) | H2/C2 | Yield (g) |
|---|---|---|---|---|---|
| 1 | 0.0069 | 10.2 | 0.25 | 0.125 | 420 |
| 2 | 0.0069 | 10.2 | 0.25 | 0.250 | 347 |
| 3 | 0.0069 | 10.2 | 0.25 | 0.500 | 269 |
| 4 | 0.0069 | 10.2 | 0.25 | 1.000 | 187 |

Characteristics of the polyethylene produced are shown in Table 2.

TABLE 2

| Test # | Fluff bulk density (g/mL) | Fluff average particle size - D50 (µm) | Fluff % fines (<63 µm) | Productivity (g/g/h) | MI2 (dg/min) | HLMI (dg/min) | Density (g/cc) |
|---|---|---|---|---|---|---|---|
| 1 | 0.39 | 156 | 3.8 | 60729 | 0.39 | 12.9 | 0.9568 |
| 2 | 0.40 | 145 | 4.5 | 50174 | 0.91 | 29.7 | 0.9581 |
| 3 | 0.40 | 134 | 4.0 | 38895 | 2.63 | 89.3 | 0.9620 |
| 4 | 0.40 | 95 | 22.4 | 27039 | 8.89 | 293.9 | 0.9645 |

Polyethylene was manufactured using a catalyst formed in accordance with reaction scheme 2(a). A TiBAl activator was used. Reaction characteristics are shown in Table 3.

TABLE 3

| Test # | g of catalyst injected | Mg in catalyst (wt. %) | Aluminum (mol/L) | H2/C2 | Yield (g) |
|---|---|---|---|---|---|
| 5 | 0.0132 | 8.4 | 0.25 | 0.125 | 420 |
| 6 | 0.0132 | 8.4 | 0.25 | 0.250 | 347 |
| 7 | 0.0132 | 8.4 | 0.25 | 0.500 | 269 |
| 8 | 0.0132 | 8.4 | 0.25 | 1.000 | 187 |

Characteristics of the polyethylene produced are shown in Table 4.

TABLE 4

| Test # | Fluff bulk density (g/mL) | Fluff average particle size - D50 (µm) | Fluff % fines (<63 µm) | Productivity (g/g/h) | MI2 (dg/min) | HLMI (dg/min) | Density (g/cc) |
|---|---|---|---|---|---|---|---|
| 5 | 0.37 | 142 | 1.9 | 31335 | 0.43 | 11.5 | 0.9535 |
| 6 | 0.35 | 138 | 2.4 | 26252 | 1.09 | 29.5 | 0.9564 |
| 7 | 0.36 | 123 | 4.3 | 19120 | 2.78 | 76.7 | 0.9600 |
| 8 | 0.33 | 109 | 8.4 | 13657 | 10.13 | 290.4 | 0.9624 |

Catalysts made in accordance with reaction schemes 1(a) and 2(a) showed comparable hydrogen responses, as shown in the FIGURE.

While the foregoing is directed to embodiments of the present disclosure, other and further embodiments of the disclosure may be devised without departing from the basic scope thereof and the scope thereof is determined by the claims that follow.

What is claimed is:

1. A process of forming a Ziegler-Natta catalyst component comprising:
   contacting an alkyl magnesium compound with an alcohol and a first organoaluminum compound to form a magnesium dialkoxide compound;
   contacting the magnesium dialkoxide compound with a titanating agent to form reaction product "A" without contacting a halogenating agent;
   reacting reaction product "A" with a halogenating agent to form reaction product "B"; and
   reacting reaction product "B" with a second organoaluminum compound to form a single halogenated catalyst component.

2. The process of claim 1, wherein the first organoaluminum compound is trimethyl aluminum (TMA), triisobutyl aluminum (TIBAl), triethyl aluminum (TEAl), tri-n-octyl-aluminum (TNOAl), n-octyl aluminum or n-hexyl aluminum.

3. The process of claim 1, wherein the second organoaluminum compound is trimethyl aluminum (TMA), triisobutyl aluminum (TIBAl), triethyl aluminum (TEAl), tri-n-octylaluminum (TNOAl), n-octyl aluminum or n-hexyl aluminum.

4. The process of claim 1, wherein the alkyl magnesium compound is butyl ethyl magnesium (BEM), diethyl magnesium, dipropyl magnesium or dibutyl magnesium.

5. The process of claim 1, wherein the alcohol is butanol, isobutanol, or 2-ethylhexanol.

6. The process of claim 1, wherein the titanating agent is $Ti(OiPr)_4$, or $Ti(OBu)_4$.

7. The process of claim 1, wherein the halogenating agent is a titanium halide.

8. The process of claim 7, wherein the halogenating agent is titanium tetrachloride ($TiCl_4$).

9. The process of claim 1 further comprising contacting the single halogenated catalyst component with an activator.

10. The process of claim 9, wherein the activator is TiBAl.

11. A process of forming a polyolefin comprising:
    supplying a Ziegler-Natta catalyst, wherein the Ziegler Natta catalyst comprises a Ziegler Natta catalyst component made by:
    contacting an alkyl magnesium compound with an alcohol and a first organoaluminum compound to form a magnesium dialkoxide compound;
    contacting the magnesium dialkoxide compound with a titanating agent to form reaction product "A" without contacting a halogenating agent;
    reacting reaction product "A" with a halogenating agent to form reaction product "B"; and
    reacting reaction product "B" with a second organoaluminum compound to form a single halogenated catalyst component; and
    contacting the Ziegler Natta catalyst with an olefin monomer in a reactor under reactor conditions to form the polyolefin.

12. The process of claim 11, wherein the olefin monomer is ethylene and the polyolefin is polyethylene.

13. The process of claim 12, wherein the fluff bulk density of the polyethylene is between 0.33 g/mL and about 0.37 g/mL.

14. The process of claim 12, wherein the fluff % fines (<63 .mu.m) of the polyethylene is from about 1.5 to 10.

15. The process of claim 12, wherein the fluff average particle size (D50) of the polyethylene is from 105 .mu.m to about 150 .mu.m.

16. The process of claim 12, wherein the molecular weight distribution ($M_w/M_n$) of the polyethylene is from about 4.5 to about 6, as measured by GPC.

17. The process of claim 12, wherein the density of the polyethylene as measured by ASTM D-792 is from about 0.95 g/cc to about 0.965 g/cc.

18. The process of claim 12, wherein the melt index (MI2) of the polyethylene as measured by ASTM D-1238 is from about 0.30 dg/min to 11 dg/min.

19. The process of claim 12, wherein the high load melt index (HLMI) of the polyethylene from is from 10 dg/min to 300 dg/min, as measured by ASTM D-1238.

* * * * *